(12) United States Patent
Ward, Jr.

(10) Patent No.: US 10,152,449 B1
(45) Date of Patent: Dec. 11, 2018

(54) USER-DEFINED CAPACITY RESERVATION POOLS FOR NETWORK-ACCESSIBLE RESOURCES

(75) Inventor: David John Ward, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 13/475,399

(22) Filed: May 18, 2012

(51) Int. Cl.
*G06Q 30/04* (2012.01)
*G06F 15/173* (2006.01)
*G06F 19/00* (2011.01)

(52) U.S. Cl.
CPC .................................. *G06F 15/173* (2013.01)

(58) Field of Classification Search
USPC .......................................................... 705/34
See application file for complete search history.

(56) References Cited

U.S. PATENT DOCUMENTS

| | | | |
|---|---|---|---|
| 5,692,174 A | 11/1997 | Bireley et al. | |
| 6,421,728 B1 | 7/2002 | Mohammed et al. | |
| 6,493,685 B1 * | 12/2002 | Ensel | G06Q 20/102 |
| | | | 705/34 |
| 7,412,538 B1 | 8/2008 | Eytchison et al. | |
| 7,637,426 B1 | 12/2009 | Green | |
| 7,743,001 B1 | 6/2010 | Vermeulen et al. | |
| 7,768,920 B2 | 8/2010 | Goshen et al. | |
| 7,769,607 B2 * | 8/2010 | Phelps | G06Q 20/10 |
| | | | 705/36 R |
| 7,870,044 B2 * | 1/2011 | Robertson | G06Q 20/102 |
| | | | 705/1.1 |
| 8,024,225 B1 | 9/2011 | Sirota et al. | |
| 8,055,493 B2 | 11/2011 | Rolia et al. | |
| 8,595,191 B2 | 11/2013 | Prahlad et al. | |
| 8,615,584 B2 | 12/2013 | Dawson et al. | |
| 9,864,725 B1 * | 1/2018 | DeSantis | G06F 15/173 |
| 2003/0028642 A1 | 2/2003 | Agarwal et al. | |
| 2003/0088482 A1 | 5/2003 | Blumberg | |
| 2003/0126196 A1 | 7/2003 | Lagimonier et al. | |
| 2003/0229529 A1 | 12/2003 | Mui et al. | |
| 2004/0030740 A1 | 2/2004 | Stelting | |

(Continued)

OTHER PUBLICATIONS

U.S. Appl. No. 13/535,720, filed Jun. 28, 2012, Matthew D. Klein, et al.

(Continued)

*Primary Examiner* — Garcia Ade
(74) *Attorney, Agent, or Firm* — Robert C. Kowert; Meyertons, Hood, Kivlin, Kowert & Goetzel, P.C.

(57) ABSTRACT

Methods and apparatus for managing user-defined capacity reservation pools for network-accessible resources are disclosed. A system includes a plurality of resource instances of a provider network, and a resource manager. In response to a pool assignment request from a client specifying a pool identifier of a reserved instance pool created on behalf of the client, the resource manager assigns one or more resource instance reservations of the client to a pool with the first pool identifier. In response to an instance activation request from the client, the resource manager identifies a particular pool created on behalf of the client from which to select a particular resource instance reservation for activation, and activates the particular resource instance.

25 Claims, 10 Drawing Sheets

(56) References Cited

U.S. PATENT DOCUMENTS

| | | | |
|---|---|---|---|
| 2004/0243430 | A1 | 12/2004 | Horstemeyer |
| 2006/0159014 | A1 | 7/2006 | Breiter et al. |
| 2007/0219837 | A1 | 9/2007 | Lu et al. |
| 2008/0080396 | A1 | 4/2008 | Meijer et al. |
| 2008/0103848 | A1 | 5/2008 | Santos et al. |
| 2008/0167928 | A1 | 7/2008 | Cao et al. |
| 2008/0243666 | A1 | 10/2008 | Rowan |
| 2009/0049114 | A1 | 2/2009 | Faraj |
| 2009/0182598 | A1 | 7/2009 | An et al. |
| 2009/0276771 | A1 | 11/2009 | Nickolov et al. |
| 2009/0281952 | A1 | 11/2009 | Toffey et al. |
| 2009/0300635 | A1 | 12/2009 | Ferris |
| 2010/0010657 | A1 | 1/2010 | Do et al. |
| 2010/0050172 | A1 | 2/2010 | Ferris |
| 2010/0070397 | A1 | 3/2010 | Hahn-Carlson et al. |
| 2010/0131624 | A1 | 5/2010 | Ferris |
| 2010/0131649 | A1 | 5/2010 | Ferris |
| 2010/0217865 | A1 | 8/2010 | Ferris |
| 2010/0241479 | A1 | 9/2010 | Chaushev |
| 2010/0306379 | A1 | 12/2010 | Ferris |
| 2011/0119104 | A1 | 5/2011 | Levine et al. |
| 2011/0131335 | A1 | 6/2011 | Spaltro et al. |
| 2011/0137805 | A1 | 6/2011 | Brookbanks et al. |
| 2011/0138050 | A1 | 6/2011 | Dawson et al. |
| 2011/0138051 | A1 | 6/2011 | Dawson et al. |
| 2011/0145094 | A1 | 6/2011 | Dawson et al. |
| 2011/0145392 | A1 | 6/2011 | Dawson et al. |
| 2011/0154353 | A1 | 6/2011 | Theroux et al. |
| 2011/0161964 | A1 | 6/2011 | Piazza et al. |
| 2011/0173038 | A1 | 7/2011 | Moon et al. |
| 2011/0173626 | A1 | 7/2011 | Chi et al. |
| 2011/0179132 | A1 | 7/2011 | Mayo et al. |
| 2011/0202657 | A1 | 8/2011 | Chang |
| 2011/0213691 | A1 | 9/2011 | Ferris et al. |
| 2011/0213712 | A1 | 9/2011 | Hadar et al. |
| 2011/0238458 | A1 | 9/2011 | Purcell et al. |
| 2011/0295986 | A1 | 12/2011 | Ferris et al. |
| 2011/0295998 | A1 | 12/2011 | Ferris |
| 2011/0296025 | A1 | 12/2011 | Lieblich et al. |
| 2012/0016721 | A1 | 1/2012 | Weinman |
| 2012/0131161 | A1 | 5/2012 | Ferris et al. |
| 2012/0159506 | A1 | 6/2012 | Barham et al. |
| 2012/0173725 | A1 | 7/2012 | Verma |
| 2013/0111027 | A1 | 5/2013 | Milojicic et al. |
| 2013/0173418 | A1 | 7/2013 | Goad et al. |
| 2013/0212279 | A1 | 8/2013 | Dutta et al. |
| 2013/0232252 | A1 | 9/2013 | Huang et al. |
| 2013/0238785 | A1 | 9/2013 | Hawk et al. |
| 2013/0246208 | A1 | 9/2013 | Jain et al. |

OTHER PUBLICATIONS

U.S. Appl. No. 13/535,715, filed Jun. 28, 2012, Matthew D. Klein, et al.
U.S. Appl. No. 13/535,707, filed Jun. 28, 2012, Matthew D. Klein, et al.
U.S. Appl. No. 13/535,725, filed Jun. 28, 2012, Matthew D. Klein, et al.
AWS Documentation, "Using Cluster Instances," downloaded from docs.amazonwebservices.com/AWSEC2/latest/UserGuide/using_cluster_computing.html on May 16, 2012, pp. 1-6.
Amazon Web Services: AWS Products & Solutions, "High Performance Computing (HPC) on AWS," downloaded from aws.amazon.com/hpc-applications/ on May 16, 2012, pp. 1-3.
Timo Schneider (personal website), "An Oblivious Routing Congestion Simulator," downloaded from perlplexity.org/Research/ORCS/ on May 16, 2012, pp. 1-8.
U.S. Appl. No. 13/431,379, filed Mar. 27, 2012, David John Ward, Jr.
U.S. Appl. No. 13/431,388, filed Mar. 27, 2012, David John Ward, Jr., et al.
U.S. Appl. No. 13/429,957, filed Mar. 26, 2012, David John Ward, Jr., et al.
U.S. Appl. No. 13/431,355, filed Mar. 27, 2012, David John Ward, Jr.
U.S. Appl. No. 13/429,985, filed Mar. 26, 2012, David John Ward, Jr., et al.
U.S. Appl. No. 13/431,348, filed Mar. 27, 2012, David John Ward, Jr.
U.S. Appl. No. 13/431,360, filed Mar. 27, 2012, David John Ward, Jr.
U.S. Appl. No. 13/430,003, filed Mar. 26, 2012, David John Ward, Jr., et al.
U.S. Appl. No. 13/431,393, filed Mar. 27, 2012, David John Ward, Jr.
U.S. Appl. No. 13/475,359, filed May 18, 2012, David John Ward, Jr.
U.S. Appl. No. 13/461,605, filed May 1, 2012, David John Ward, Jr., et al.
U.S. Appl. No. 13/476,828, filed May 21, 2012, David John Ward, Jr., et al.
U.S. Appl. No. 13/475,461, filed May 18, 2012, David John Ward, Jr., et al.
"Amazon EC2 Spot Instance," Amazon Web Services LLC, Downloaded Mar. 26, 2012, 11 pages.
"Amazon EC2 Instance Types," Amazon Web Services LLC, Downloaded Mar. 26, 2012, 5 pages.
"Amazon EC2 Reserved Instances," Amazon Web Services LLC, Downloaded Mar. 26, 2012, 6 pages.
"Amazon EC2 Instance Purchasing Options," Amazon Web Services LLC, Downloaded Mar. 26, 2012, 2 pages.
"Amazon EC2 Pricing," Amazon Web Services LLC, Downloaded Mar. 26, 2012, 8 pages.
U.S. Appl. No. 13/331,750, filed Dec. 20, 2011, Amazon Technologies, Inc., all pages.
Amazon Web Services, "Discussion Forums; Existing Connections Dropped Rudely when Instance Taken out of ELB", Eric Hammond, Feb. 25, 2011, pp. 1-7.
Amazon Web Services, "Amazon Elastic Compute Cloud (Amazon EC2)", Mar. 24, 2011, pp. 1-26.
Amazon Web Services, "Amazon EC2 Pricing", Feb. 28, 2011, pp. 1-13.
Amazon Web Services, "Amazon EC2 Spot Instances", Feb. 24, 2011, pp. 1-5.
Amazon Web Services, "Amazon CloudWatch", Feb. 24, 2011, pp. 1-5.
Agarwal, Sharad, et al. "Volley: Automated Data Placement for Geo-Distributed Cloud Services." 2010, pp. 1-16.

* cited by examiner

900

Reserved Instance Pool Creation Page https://<website>.com/createPool

Dear John Doe, Welcome to the reserved instance pool management center! ← 903

Please provide details for the RI pool you would like to create.

| | | |
|---|---|---|
| Pool name | [ ] | ← 907 |
| Pool description/purpose | [ ] | ← 909 |
| Is your account the master billing account for this pool? | Yes (default) | ← 911 |
| Other account(s) to be linked (provide account names or numbers) | [ ] | ← 913 |
| Shared pools | None (default) | ← 915 |
| Initial instance count in this pool | 1 (transfer from default pool) | ← 917 |
| Initial instance size, uptime ratio | Small, Low uptime ratio (default) | ← 919 |
| Maximum number of instances in pool | No maximum (default) | ← 921 |
| Access control policy | Default | ← 923 |
| Resource activation policy | If named RI pool is exhausted, try shared pools; if shared pools are exhausted, transfer from default pool (default) | ← 925 |
| Default machine instance for pool | AMI-a9791-0e36301 | ← 927 |

[Create this pool!] ← 991

*Figure 9*

USER-DEFINED CAPACITY RESERVATION POOLS FOR NETWORK-ACCESSIBLE RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of long-term resource reservations, customers may typically pay an upfront free for making the reservation, and in addition may have to pay usage-based fees for periods when the reserved resource is activated. In many cases, customers may make long-term reservations for some expected level of workload for each of several application types, and may rely on using (potentially more expensive) on-demand instances if and when the workload of any of the application types increases beyond the expected level. However, if the provider network itself experiences high utilization levels at the time that the customer's load spikes, and especially if one of the reserved resources experiences a failure during such a high-load period, it may become difficult for the customer to acquire the resources needed for the customer's application workload.

BRIEF DESCRIPTION OF THE DRAWINGS

FIG. 9 illustrates a portion of an example web-based interface that may be implemented to allow clients to submit reserved instance pool creation requests, according to some embodiments.

Figure 1:
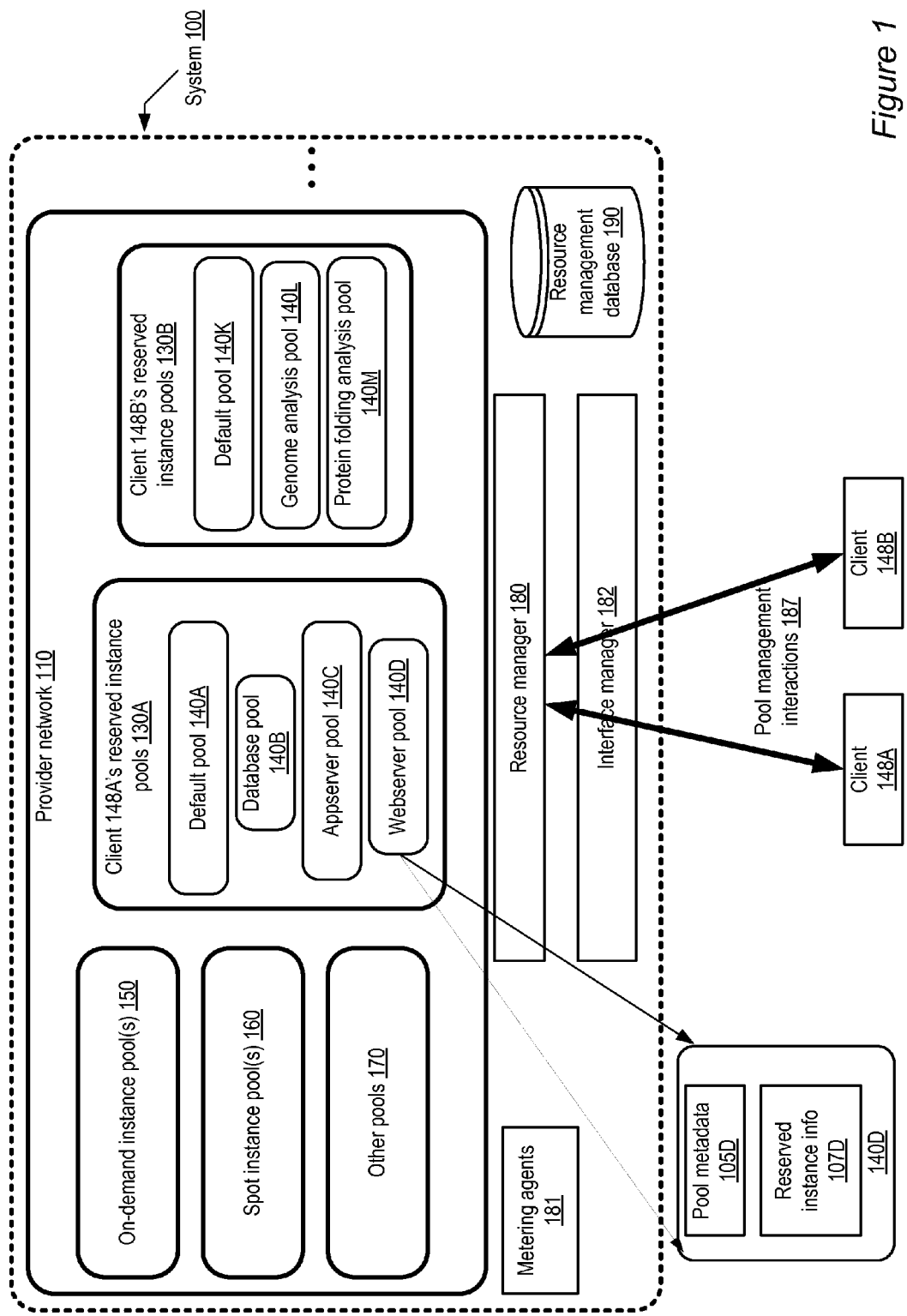
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing flexible capacity pool reservations for network-accessible resources are described. Networks set up by an entity such as a company or a public sector organization to provide one or more services (such as various types of cloud-based computing and/or storage) accessible via the Internet and/or other networks to a distributed set of clients may be termed provider networks in this document. Such a provider network may include numerous data centers hosting various resources, such as collections of physical and/or virtualized computer servers, storage devices, networking equipment and the like, needed to implement and distribute the infrastructure and services offered by the provider. The resources may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, an interface manager of the provider network may implement a programmatic interface (e.g., via a web site, a set of web pages, or one or more application programming interfaces (APIs)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The requests received via the interface or interfaces may be handled by a resource manager, and the responses to the requests may be transmitted via one or more of the interfaces back to the requesting client. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client wishes to activate one or more instances that were previously reserved but had not yet been activated, or to a client that is willing to pay a higher spot price. The resource manager may thus be able to use reserved (but currently unused) resource capacity to meet spot-market demand, or even to satisfy on-demand instance requests, thereby increasing overall resource utilization levels without sacrificing the guarantees for long-term reservations. In addition to long-term reserved instances, on-demand instances and spot instances, other purchasing modes or combinations of modes may be implemented by the resource manager in some embodiments.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on.

In some embodiments, at a given point in time, a client may have a number of resource instances in active state (e.g., running various combinations of applications). Some of these instances may have been activated to fulfill the client's reservations; others may have been allocated to the client in on-demand mode or in spot-price mode. For example, a client that implements a service requiring database servers and web servers may have initially anticipated a workload that required no more than X instances, of which up to Xdb instances were expected to be used for database operations and up to Xws instances were expected to be used for web server operations. The client may therefore have made X reservations, where X=Xdb+Xws, and may have instantiated Xdb database serve instances and Xws web server instances. If the provider network enters a period of heavy utilization (i.e., such that on-demand instance requests begin to be rejected, and the spot price becomes very high due to high demand), it may not be easy to acquire additional on-demand or spot instances. Continuing the above example, if one of the Xdb database server instances fails, and the client wishes to acquire another instance to replace the failed database server, the client may have to release one of the Xws web server instances (thereby freeing up the capacity reserved for that web server instance) in order to activate a reservation for the replacement database server. Thus, the capacity needs related to the client's database needs may, in such a scenario, have a negative impact on the resources allocated to the client's web server needs.

In order to avoid such scenarios, in at least some embodiments, a resource manager may be operable to allow a client to specify named pools of the client's reserved instances, where for example each pool is dedicated to a different client-designated purpose and has a minimum pool size and/or other client-specified pool constraints. For example, in the above example, the client may request that the resource manager create two named pools: a "database" reserved instance pool guaranteeing that Xdb reserved instances will be available during the reservation term for database purposes, and a "web server" reserved instance pool guaranteeing that Xws reserved instances will be available during the reservation term for web server purposes. Thus, when a database server instance fails, the resource manager may be responsible for providing a replacement instance based on the number of reservations included in the database reserved instance pool, without affecting any of the web server pool instances. Various services related to the management of client-specified reserved instance pools may be provided by the resource manager in some embodiments, such as the ability to add, remove or transfer instances from one named pool to another, to receive billing reports or usage metrics reports organized by named pools, and so on.

In one embodiment, for example, the resource manager may, in response to a pool assignment request from a client specifying a pool identifier (e.g., a name that may have been provided by the client) of a reserved instance pool created on behalf of the client, assign one or more resource instance reservations of the client to a pool with the first pool identifier. In response to an instance activation request from the client, the resource manager may identify a particular pool created on behalf of the first client from which to select a particular resource instance reservation for activation, and activate or launch a particular resource instance corresponding to the particular resource instance reservation. When a bill or billing report is provided to the client for the client's use of the instance that was activated, the name or identifier of the pool to which the corresponding reservation was assigned may be included in the billing information, thus allowing the client to distinguish between the costs of the different pools. In some embodiments, the resource manager may create one or more pools as a default for a given client, and may create additional pools in response to pool creation requests from the clients, where each pool creation request may include a desired pool name or identifier, as well as various other desired pool characteristics and/or constraints. In one embodiment, a resource manager may transfer instance reservations from one named pool to another in response to client requests.

The resource manager may also perform a variety of other billing-related operations related to the use of client-defined reserved instance pools in some embodiments. For example, the resource manager may, at the request of one client that owns a particular reserved instance pool P1, link one or more other billing accounts (i.e., accounts for users or entities other than the owner client) to pool P1. Such account linkage may allow the clients or users with the linked accounts to access and/or use the reservations of pool P1. In some cases the billing reports or statements generated for the instances of such a linked pool P1 may identify all the billing accounts associated with the pool. In some implementations any of the users with a linked account may acquire instances from the pool P1. In one embodiment, in response to a client request, reservations may be moved from one pool owned by one entity or user, to a different pool owned by a different entity or user with a linked billing account. A resource manager may support pool sharing in some embodiments, with or without billing account linkage. For example, in response to a pool sharing request specifying that a first client and a second client are to share access to a particular pool, the resource manager may update pool metadata for the particular pool to indicate the sharing policy. In response to a subsequent request for a resource instance reservation or activation from the second client, the resource manager may assign a resource instance reservation from the particular pool to the second client, or may activate an instance corresponding to a reservation from the particular pool for the second client. Pool sharing and account linkage capabilities may be particularly useful for third party providers that may serve as intermediaries between their own clients and the provider network. For example, a third-party provider TP may have two clients A and B, for which TP is responsible for managing reservations of the provider network's resource instances. TP may have reserved 100 instances for A and 50 instances for B based on anticipated resource usage levels. During the term of the reservations, the number of instance reserved by TP on behalf of A or B may in some scenarios be found to be suboptimal (e.g., due to an increased demand by B and a reduced demand by A). By creating named accounts for A and B, linking the accounts of A and B, and/or requesting pool sharing between the pools for A and B, TP may be able to more efficiently use the combination of reservations made initially.

In some embodiments, as noted above, an interface manager may be responsible for providing one or more programmatic interfaces for reservation-related operations. Such an interface manager, which may be implemented as a subcomponent of the resource manager in some embodiments, may also support various pool-specific interactions. For example, programmatic interfaces provided by the interface manager may allow clients to include pool identifiers or names in resource activation requests, billing report requests, pool creation requests, instance status requests, pool status requests, instance description requests, pool description requests, reservation transfer or assignment requests, user account description requests, and so on, that are handled by the resource manager.

In one embodiment, a resource manager may be able to respond to reservation-related requests that specify pool identifiers, and may also handle reservation requests that do not specify pool identifiers. For example, a default pool may be set up for each client, such that any reservations for which the client does not explicitly specify a pool are placed in the client's default pool. In response to a resource activation request from the client, where the request does not specify a pool identifier, for example, the resource manager may select a reservation from the default pool for activation. Client requests for new reservations may also specify the pool name or identifier of a pool into which the reservation is to be placed in some embodiments. In response to such a reservation request, the resource manager may create a new reservation with the desired properties (e.g., reservation term, instance size and so on) indicated in the request, and include the reservation in the specified pool of the requester.

Example System Environment

FIG. 1 illustrates an example system environment, according to at least some embodiments. The system 100 includes a provider network 110 with a plurality of resource instances organized into several client-specific pools (such as client 148A's set 130A of reserved instance pools, and client 148B's set 130B of reserved instance pools), as well as shared or global pools including on-demand instance pools 150, spot instance pools 160 and other pools 170. Further details regarding on-demand instances of pool 150 and spot instances of pool 160 are provided below in conjunction with the description of FIG. 2. In this document, the term "RI pool" may be used as an abbreviation for the term "reserved instance pool". Two sets of RI pools are shown in the illustrated example. RI pools 130A for client 148A include a default pool 140A, a database pool 140B, an application server pool 140C, and a web server pool 140D. RI pools 130B for client 148B include another default pool 140K, a genome analysis pool 140L and a protein folding analysis pool 140M. A default pool such as 140A and 140K may be set up in some embodiments for those reserved instances of a client that are not explicitly assigned to any other named RI pool created on behalf of the client. As implied by their respective names, several of the RI pools of clients 148A and 148B are named and organized on the basis of the types of applications for which the corresponding instance reservations are set up. For example, client 148A may have a multi-tiered web-based service that requires database management systems, application servers, and web servers; consequently, client 148A may have set up three RI pools 140B, 140C and 140D for each of the three types of applications. Similarly, client 148B may be running various biology-related computation workloads, and may have set aside one pool of reserved instances 140L for genome analysis, and another pool 140M for protein folding analysis. In general, clients may set up RI pools for any desired reason, and may specify arbitrary names for the pools—for example, instead of naming pools based on the intended application types, RI pools may be named or set up based on the dates at which their reservations expire, the organizational entity (such as a department within a corporation) that owns or manages the reservations, the groups of individual users within a client's organization that are allowed to activate the reservations, and so on.

In system 100, resource manager 180 may be responsible for implementing various operations related to RI pool management, in addition to being responsible for other operations not directly related to RI pools, such as acquiring on-demand instances or spot instances for clients 148. In some embodiments, an interface manager 182 separate from the resource manager 180 may implement one or more programmatic interfaces usable by clients 148 to interact with the resource manager 180 for RI pool-related activities, as shown by the arrow labeled 187 in FIG. 1. In other embodiments, the interface manager 182 may be implemented as a subcomponent of the resource manager 180. For each RI pool, the resource manager 180 may store pool metadata (such as metadata 105D shown for pool 140D) as well as information about the reserved instances of the pool (such as information 107D for pool 140D). Further details regarding the types of information maintained by the resource manager for RI pools are provided below in conjunction with the description of FIG. 3. The metadata 105 and/or reserved instance information 107 for a given RI pool may be stored in a persistent store such as resource management database 190 in some embodiments. In the illustrated example system 100, one or more metering agents 181 may be configured to obtain various resource usage metrics for the various instances and instance pools—for example, the network traffic generated by the instances corresponding to a given RI pool 140 may be tagged in such a way that network usage statistics may be organized based on respective RI pools whose instances are involved in the traffic. In such a tagging scenario, the total network traffic in and out of client 148A's RI pool instances during a given billing period may be broken down into separate traffic and/or billing amounts for each RI pool 140A, 140B, 140C and 140D. Similarly, CPU and/or storage-related usage metrics may also be segregated by RI pool in some embodiments.

As noted above, resource manager 180 may implement a variety of RI pool-related functions. In one embodiment, resource manager 180 may create one or more RI pools for a given client 148. A default pool may be created as a general-purpose container of each client's reserved instances in some implementations, without the need for a specific pool creation request from the client. Other pools, such as pools 140B, 140C, 140D, 140L and 140M may be created in response to a client's pool creation requests, where each pool creation request may specify a number of properties or characteristics of the pool, as described in further detail below in conjunction with the description of FIGS. 3 and 4. In some embodiments the resource manager 180 may monitor the characteristics of reserved instance resource usage (e.g., the sources and destinations of network traffic associated with reserved instances, or the CPU and storage device utilizations at various reserved instances), and may be able to recommend that the client 148 separate different subsets of reserved instances into named pools based on the observed resource usage patterns. For example, intelligent metering agents 181 may be able to deduce that one set of reserved instances is being used for web server workloads while another is being used for database workloads, and may recommend that the client request the creation of a separate pool for each type of workload. Resource manager 180 may also handle pool assignment requests from clients, in which the client indicates an RI pool to which one or more newly obtained or previously-existing reservations are to be assigned in some embodiments. Reservation transfer requests from clients 148 may result in the resource manager moving or reassigning a reserved instance from a specified source RI pool 140 to a different destination RI pool 140 in at least some embodiments. The resource manager 180 may also support various other types of requests in some embodiments, including for example RI pool renaming requests, RI pool deletion requests, RI pool sharing requests (e.g., allowing multiple clients or users 148 to access an RI pool initially set up for a given client 148), RI pool billing account linkage requests, reservation requests specifying a target RI pool for the newly-created reservation, and RI pool description/status queries, as described below in further detail.

A client 148 may also submit a resource activation request to the resource manager 180 in some embodiments, indicating that an instance corresponding to a reservation is to be launched or activated so that the client may for example run one or more applications. In some such embodiments the resource manager 180 may accept at least two types of resource activation requests: those that indicate a desired RI pool from which a reservation is to be activated, and those that do not specify a target RI pool. In response to a resource activation request (of either type), the resource manager 180 may be responsible for identifying the particular RI pool from which a reservation should be selected for activation. In the case where a target RI pool 140 is named or specified in the activation request, the resource manager may first attempt to find an appropriate currently unfulfilled reserved instance (i.e., a reservation for which no instance is currently running) from that pool, and if such a reservations is found, activate the corresponding instance. If no such reservation can be found in the specified RI pool, in at least one embodiment the resource manager 180 may reject the activation request and/or acquire a non-reserved instance such as an on-demand instance or a spot instance for the client. In other embodiments, an activation policy associated with the specified RI pool may be consulted, to determine for example whether one or more other RI pools should be considered for the activation request, and if so, in what order the other pools should be examined. For example, according to one such embodiment, if a reservation matching the resource capacity requested in an activation request cannot be found in the specified RI pool, the resource manager 180 may be configured to see if an appropriate instance can be found in an RI pool that is configured for shared access by the requesting client; then, if no such shared instance can be found, the resource manager may search the requesting client's default pool, and so on. Further details regarding activation policies are provided below as well. If a client does not specify a target RI pool in an activation request, in one embodiment the resource manager may attempt to find an appropriate reservation in the client's default pool.

Resource manager 180 may also be responsible for generating and/or providing clients 148 with billing reports, which may include various line items indicating usage amounts and/or billing components for the different RI pools of the clients. In some embodiments, a metrics agent 181 may store usage statistics classified on the basis of the RI pools in resource management database 190, from which the resource manager 180 may retrieve the data for billing statements or reports. In some embodiments a billing manager, which may be implemented either as a separate entity or as a subcomponent of resource manager 180, may be responsible for at least some of the billing-related functionality associated with RI pools. Client requests to create new reservations (as opposed to new RI pools) may also specify the pool name or identifier of a pool into which the reservation is to be placed in some embodiments. In response to such a request, the resource manager 180 may create a new reservation with the properties (e.g., reservation term, instance size and so on) indicated in the request, and include the reservation in the specified pool of the requesting client 148.

Resource Instances Categories and Associated Pricing Models

Figure 2A:
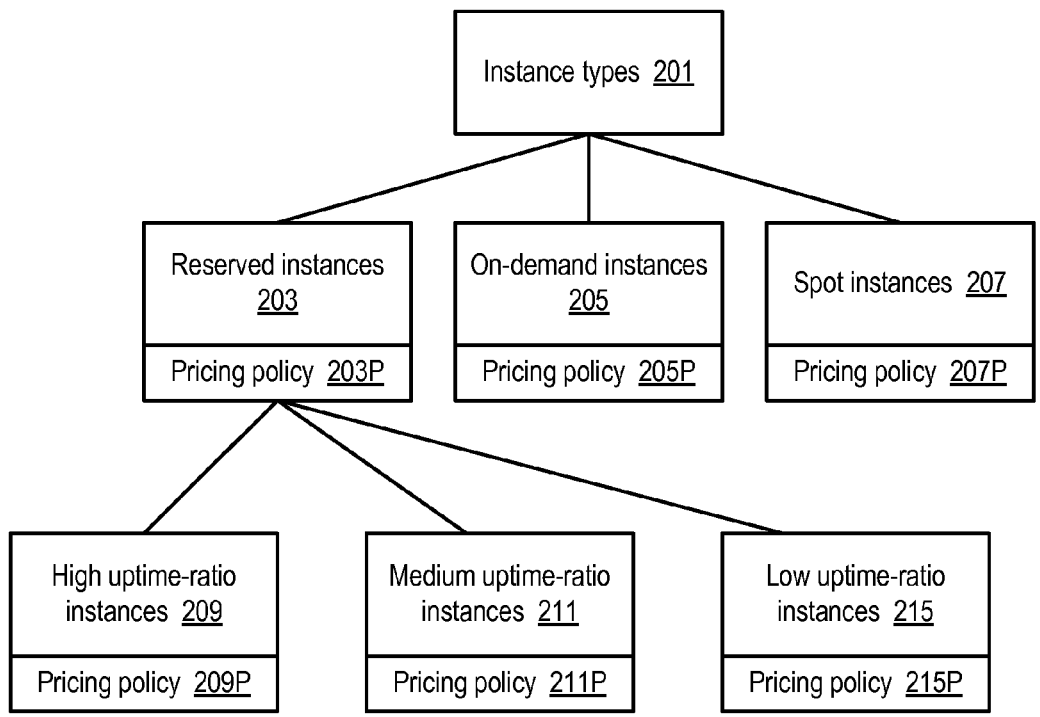
FIGS. 2a and 2b illustrate example resource instance classification approaches, according to at least some embodiments.
Figure 2B:
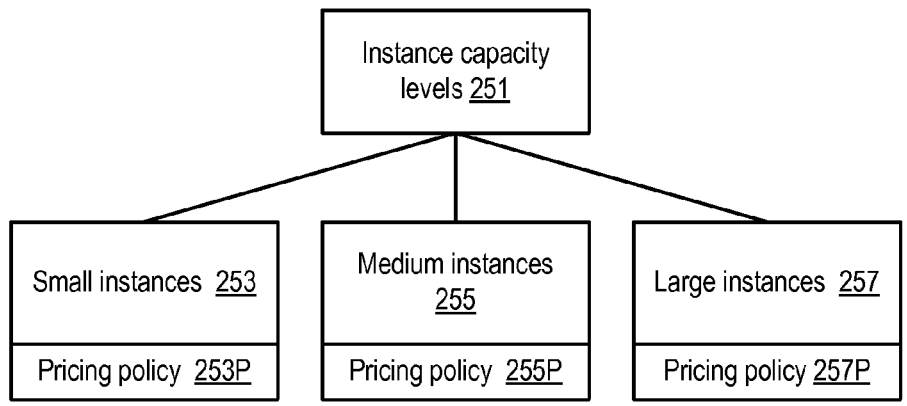

The resource instances of a provider network 110 may be grouped into classes or categories based on several different dimensions in some embodiments, and the pricing policies associated with different classes may differ. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients. Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 207P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down).

The prices of reserved instances 203, on-demand instances 205, and spot instances 207 may also vary based on the availability zones or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs.

Instance pricing may also vary based on other factors. For example, in the case of compute instances, the performance capacities of different CPUs and other components of compute servers such as memory size may come into play. FIG. 2b shows an example classification of compute instances based on instance performance ratings or capacity levels 251. Large instances 253 may have more computing capacity than medium instances 255, which in turn may have more computing capacity than small instances 257. Accordingly, different pricing policies 253P, 255P and 257P may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. Some or all of the pricing information may be stored in resource management database 190.

As shown in FIG. 1, in some embodiments a resource manager 180 may set up various instance pools for each of the instance types supported (reserved instances, on-demand instances, and/or spot instances). In the example system of FIG. 1, reserved instances are further assigned into pools specific to clients 148, while global or multi-client pools are shown for on-demand instances (pool 150) and spot instances (pool 160). In some embodiments on-demand instances and/or spot instances may also be organized on a per-client basis. In one embodiment the reserved instances of a given client 148 may be organized into pools based at least in part on the uptime ratios of the corresponding reservations—e.g., there may be a separate high uptime ratio RI pool, a separate low uptime ration RI pool, and so on. It is noted that the various types of pools referred to herein may represent logical aggregations, and the fact that a given reservation or resource instance belongs to a particular RI pool may have no bearing on the physical location of any of the corresponding resources of the provider network.

Metadata for Reserved Instance Pools

Figure 3:
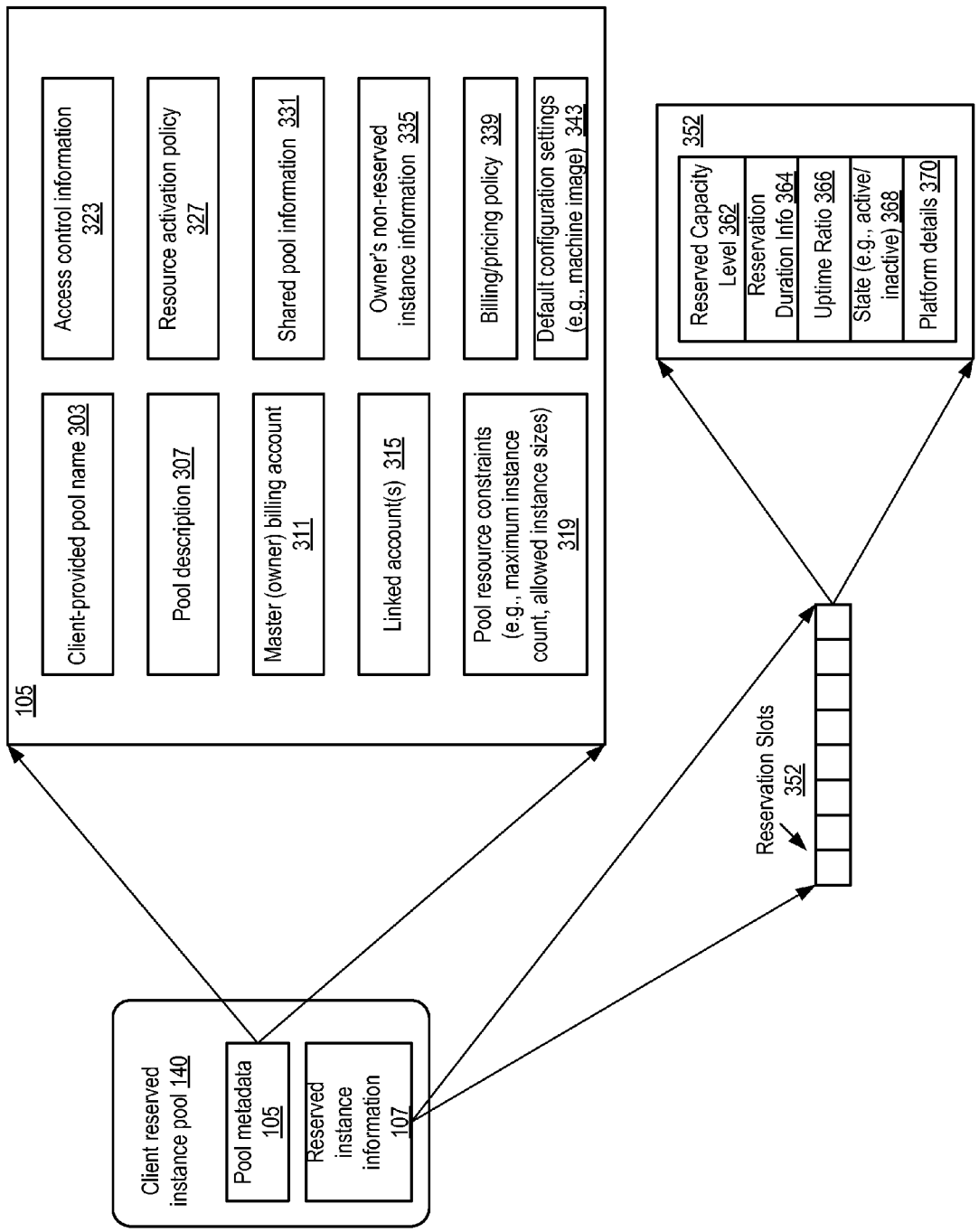
FIG. 3 illustrates example constituent elements of reserved instance pool metadata and reservation information that may be maintained by a resource manager, according to at least some embodiments.

In some embodiments, as noted above, the information maintained for an RI pool 140 may include metadata 105 as well as information 107 about the set of reserved instances of the pool. FIG. 3 illustrates example constituent elements of RI pool metadata 105 and reservation information 107 that may be maintained by a resource manager 180, according to at least some embodiments. As shown the pool metadata 105 may include a client-provided pool name 303 in some embodiments, as well as a client-provided pool description 307. The resource manager 180 may map the client-provided pool name to a unique pool identifier in some embodiments, and inform the client regarding the unique identifier; the client 148 may refer to the RI pool using either its name 303 or the identifier generated by the resource manager in such embodiments.

In some embodiments each RI pool 140 may be associated with a master billing account 311 representing the "owner" of the pool. The master billing account may represent the billable entity (e.g., an authorized customer/client/user or group of customers/clients/users of the provider network) responsible for making payments for the reservations of the pool. In some embodiments a billing account may be associated with multiple user accounts—e.g., one of the customers of the provider network may be a corporation C that has set up two billing accounts B1 and B2, and has obtained authorized access for 100 distinct user accounts, allowing up to 100 concurrent users to access the resources of the provider network. Each user account may have a separate login identifier or user name in some implementations. In other embodiments, there may be one-to-one relationships between clients, user accounts, and billing accounts: that is, each client or customer may have their own billing account and authorized user account. In some implementations, access to the provider network resources may be provided to named groups (such as the groups defined in various Unix-based operating systems for file and directory access control), and any user account added to a named group may obtain the level of access granted to the group. In the illustrated embodiment, the resource manager 180 (or a billing manager) may be responsible for providing billing statements and/or billing reports for resource usage and/or reservations of the RI pool to the owner of the master billing account 311. In some implementations the default owner of the master billing account 311 for an RI pool may be the entity that requested the creation of the RI pool. In the case of a default RI pool, the resource manager 180 may be responsible for identifying the billing account for which the default RI pool is being created, and the identified billing account may serve as the master.

The resource manager 180 may store information about linked accounts 315 as well as the master billing account 311 in some embodiments. For example, the owner of the master billing account 311 may request that one or more other accounts (which may be billing accounts, user accounts, or group accounts) be linked to the RI pool. Such linkage may be useful for a number of reasons in different embodiments. For example, a particular RI pool with a master billing account 311 associated with an entire company may be created, and several departmental accounts may be created for different departments within the company. The company's financial officers may wish to obtain consolidated billing information for all the departments, for which account linkages may be used by the resource manager 180. Accounts may also be linked for providing shared access to RI pools 140 in some embodiments: for example, identifiers or names of one or more other RI pools (with either the same master billing account 311 or different master billing accounts 311) may be included in shared pool information field 331, and entities represented by any of the linked accounts 315 may be given access to the one or more shared RI pools.

In one embodiment a client 148 may specify one or more resource constraints 319 on an RI pool, such as the minimum and/or maximum total number of reservations allowed in the pool, the capacity level(s) (e.g., small vs. medium vs. large instances) of the reserved instances allowed in the pool, the minimum and/or maximum number of inactive reservations allowed, and so on. Details about the level of access provided to the various master and/or linked accounts may be stored within an access control information field 323 in some embodiments: for example, some users may be allowed to request reservation transfers from one RI pool to another, while others may be restricted to activating existing reservations in the pool in which the reservations are currently located.

In some embodiments, the metadata 105 may include details of a resource activation policy 327 for the pool. The activation policy may specify, for example, what actions the resource manager 180 is to take if a resource activation request specifying the pool cannot be matched to an existing reserved instance of the pool (as may happen when all the reservations of the pool have already been activated, for example). According to one such activation policy 327, if no reservation matching the request can be found within the specified RI pool, the resource manager may be directed to obtain an on-demand instance if one is available, or a spot instance if no on-demand instance is available and a spot instance is available. According to another activation policy, before resorting to on-demand instances, the resource manager 180 may be directed to first try to find a shared RI pool (e.g., one identified in shared pool information 331) from which a reservation may be activated. If no appropriate shared pool reservation is found, the resource manager 180 may look within the default pool of the master billing account 311 to identify an appropriate reservation in accordance with such an activation policy 327. If no matching reservation is found in the default pool, the policy might direct the resource manager to look for appropriate reservations in any other non-default non-shared pools. If even the non-default non-shared pools do not contain a satisfactory reservation, the resource manager may attempt to obtain an on-demand instance. Thus, in the above example, the activation policy 327 may control the sequence in which the resource manager examines various RI pools in an attempt to satisfy a resource activation request. Information about other RI pools to which access is shared by the master and linked accounts may be stored in field 331 as indicated above.

As described earlier, at any given point in time a client may have been allocated various on-demand instances and/or spot instances, in addition to reserved instances. Information about the currently allocated non-reserved instances (e.g., on-demand or spot instances) of the owner of the RI pool may be stored in field 335 in some implementations, allowing a comprehensive listing or view of all the owner's instances to be obtained. Details of various billing/pricing policies in use for the RI pool may be stored in element 339, e.g., the amount the owner client may be charged for various pool management operations, such as inter-pool reservation transfers, generation of custom billing reports, and the like.

In some embodiments the types of applications for which the RI pool is set up may benefit from the use of a pool-specific set of configuration parameters settings—e.g., one set of operating system tunable values may be better for database server instances of RI pool 140B of FIG. 1, and another set for web server instances of RI pool 140D. Information about such default configuration settings, which may include an identification of a default machine image for virtual compute instances of the pool, may be stored in field 343 of metadata 105 in some embodiments.

Information about the actual reservations of the RI pool may be maintained in the form of reservation slots 352 in some embodiments, where each slot 352 may include an indication of the reserved capacity level 362 (e.g., whether the reservation is for a small, medium or large instance). Each reservation slot 352 may have an associated reservation term or duration 364, and in some implementations an associated uptime ratio 366. State information 368 may indicate whether the instance is currently active (i.e., whether an instance corresponding to the reservation is currently booted up, on-line and accessible over a network) or inactive (i.e., no instance is currently booted up for the reservation). For active instances, in some implementations information about the hardware/software/virtualization platform being used for the instance may be stored in platform details field 370. Platform information may for example include one or more Internet Protocol (IP) addresses usable to access the running instance, information about the type or identity of the hardware server being used, and/or physical location information such as the availability zone, data center room or rack, and so on. Prior to instance activation, or during inactive periods when no instance is booted up for the reservation, the information stored in the reservation slot 352 (e.g., fields 362, 364, 366 and 368) may logically represent the reserved instance in some embodiments; during periods when there is a booted-up instance, the term "reserved instance" may refer to both the reservation slot information and the booted-up instance itself.

It is noted that in some implementations, some or all of the various fields shown for metadata 105 and instance information 107 may comprise pointers to other entities where the underlying information is stored, instead of storing all the information within the fields themselves. For example, resource activation policy field 327 may contain a pointer to (or an identifier of) a policy whose full details are stored elsewhere, such as within a table of activation policies in the resource management database 190. RI pool metadata 105 and/or instance information 107 may itself be stored within the resource management database 190 in some implementations.

RI Pool-Related Interactions Between the Resource Manager and Clients

Figure 4:
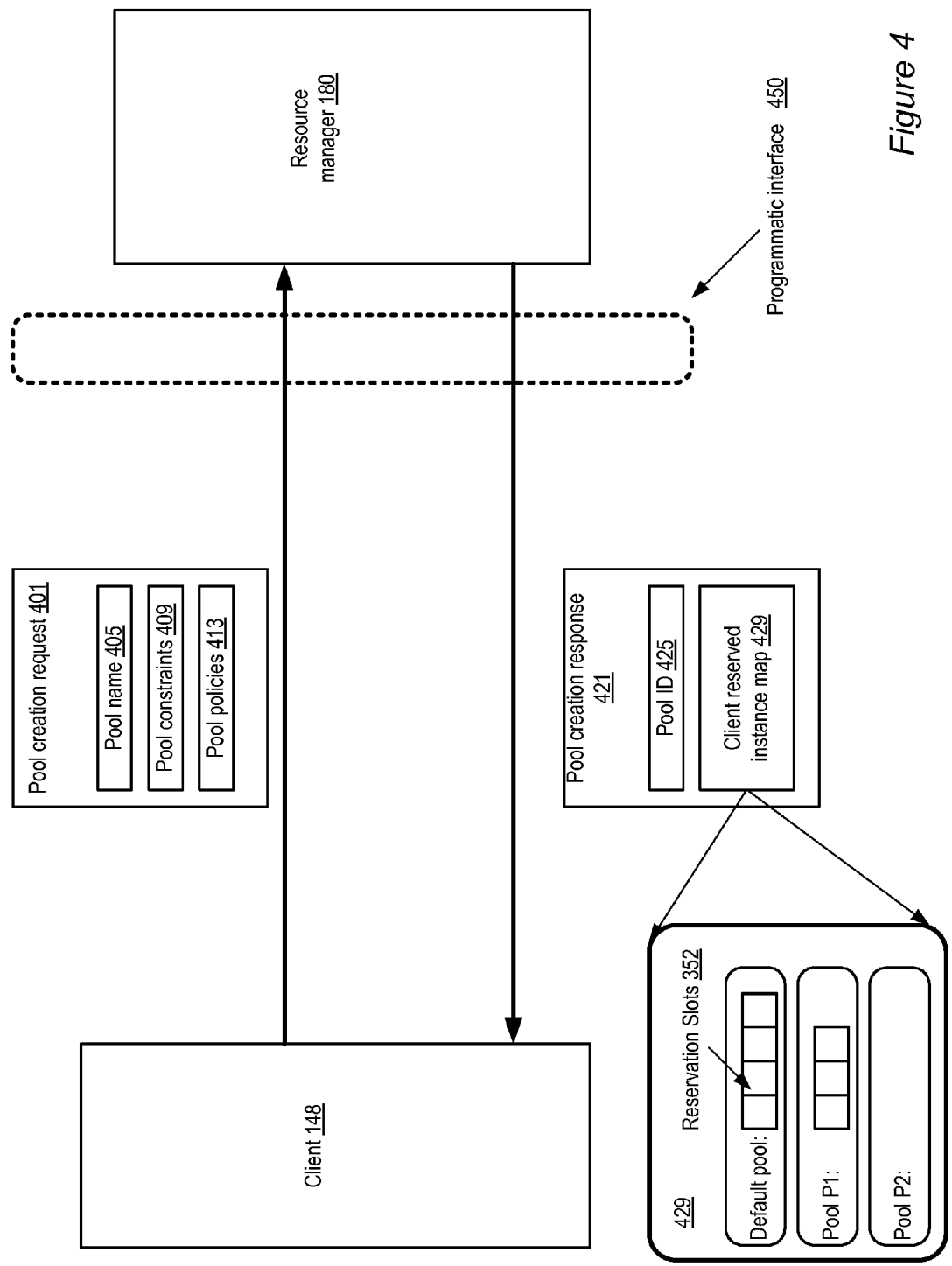
FIG. 4 illustrates a submission of a reserved instance pool creation request by a client to a resource manager, according to at least some embodiments.

FIG. 4 illustrates a submission of a reserved instance pool creation request by a client 148 to a resource manager 180, according to at least some embodiments. As shown, the client 148 may specify a pool name 405, one or more pool constraints 409, and one or more pool policies 413 in the pool creation request 401. The request 401 may be submitted in accordance with a programmatic interface 350 in some embodiments. Pool constraints 409 may include limits on the minimum and maximum pool size, the types of instances (e.g., small or large instances) that may be reserved in the pool, and so on. Pool policies 413 may include account linkage properties (e.g., whether other accounts can be linked to the pool), resource activation policies 327, pool sharing policies (e.g., whether the pool can be shared with other clients), access control policies, and the like.

In response to receiving the pool creation request 401, in some embodiments the resource manager 180 may verify that the requesting client is authorized to create pools. The resource manager may then create and/or store the metadata 105 for the requested pool and create an initial set of reservation slots 352 for the requested pool. In the illustrated embodiment the resource manager submits a pool creation response 421 back to the client 148 using the programmatic interface 450. The response 421 shown includes an identifier 425 of the new pool (which may for example be a unique string generated by the resource manager, or may be a string based on the pool name 405), as well as a map 429 of the client's current reserved instances. The identifier 425 may be used by the client in subsequent pool-related requests or activation requests sent to the resource manager 180 in some implementations. Map 429 may indicate to the client the current set of RI pools created for the client 148, as well as the size (e.g., number of reservation slots, and/or types of instances reserved) and details of the RI pools of the client 148.

Figure 5:
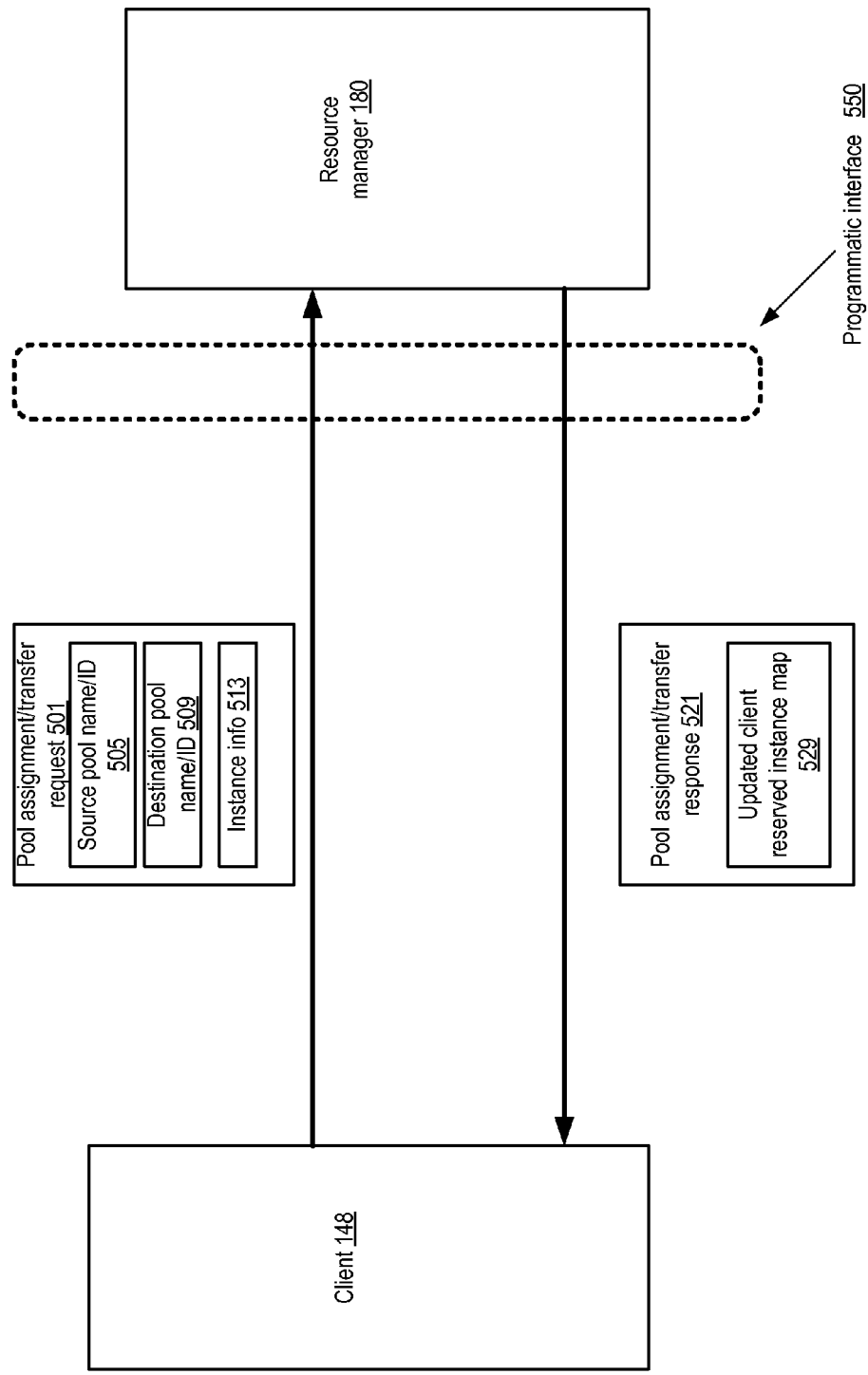
FIG. 5 illustrates a submission of a transfer/assignment request by a client to a resource manager, according to at least some embodiments.

FIG. 5 illustrates a submission of a transfer/assignment request 501 by a client 148 to a resource manager 180, according to at least some embodiments. In one embodiment, an assignment request may indicate the particular destination RI pool 509 to which a newly acquired reserved instance or an instance from the client's default RI pool is to be assigned. A transfer request may specify a source RI pool 505 from which a reserved instance is to be moved to the specified destination pool 509. (For an assignment request, the source pool field identifier 505 may be omitted or left unfilled in some implementations.) Information about the particular reservation or the type of reservation to be assigned/transferred may be provided in field 513. In response to a transfer or assignment request 501, the resource manager 180 may validate that the requesting client 148 has the appropriate permissions, and then perform the requested assignment or reservation transfer. In an assignment/transfer response 521, the resource manager 180 may include an updated client reserved instance map 529 showing the current distribution of the client's reserved instances among various RI pools. The assignment/transfer interactions may use a programmatic interface 450 implemented by the interface manager 182 in some embodiments.

Figure 6:
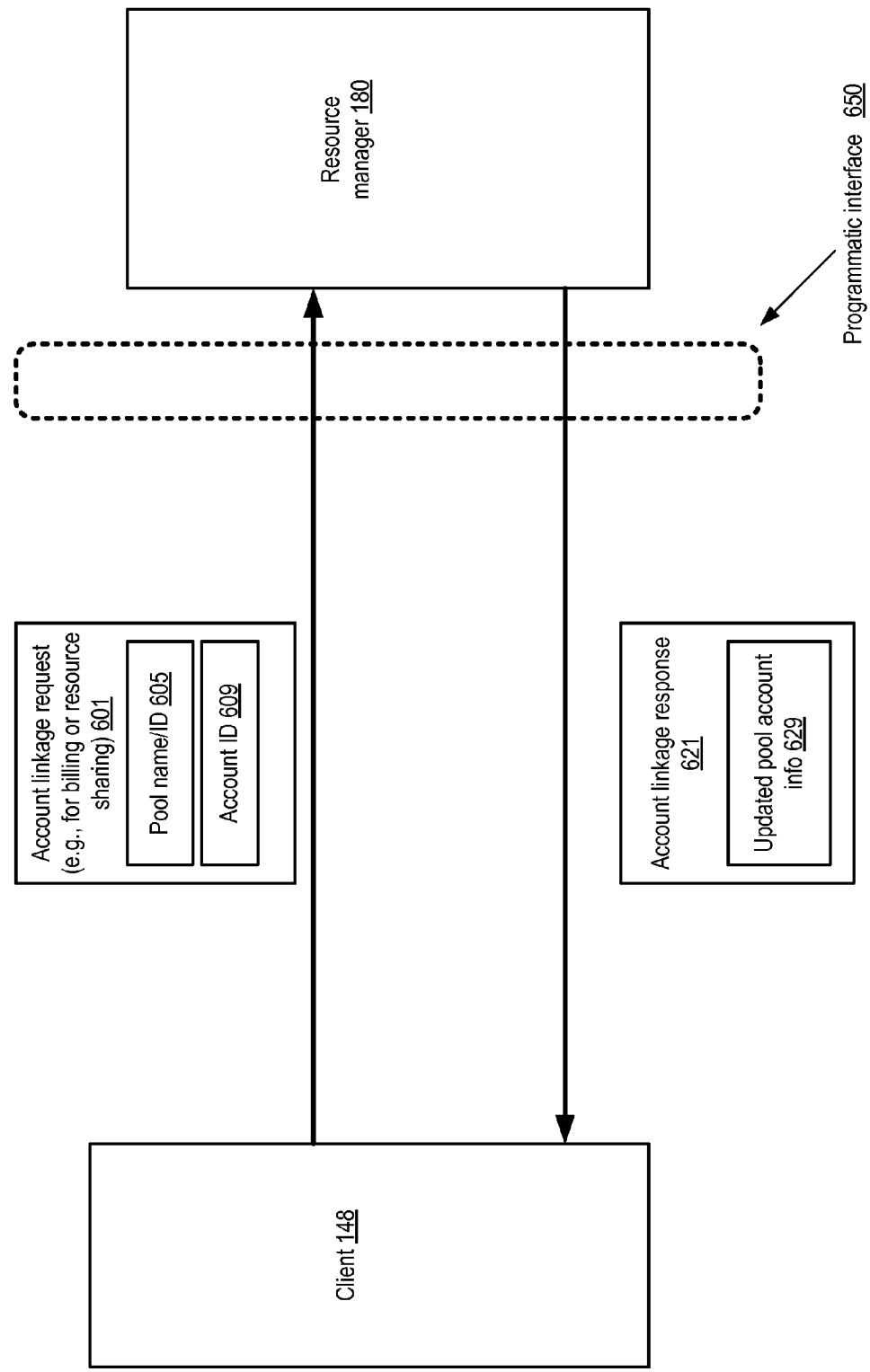
FIG. 6 illustrates a submission of an account linkage request by a client to a resource manager, according to at least some embodiments.

FIG. 6 illustrates a submission of an account linkage request 601 by a client 148 to a resource manager 180, according to at least some embodiments. The account linkage request may include an identifier or name field 605 indicating the specific RI pool to which the account with identifier 609 is to be linked. As noted earlier, account linkage may be supported for a variety of purposes in different embodiments, such as for consolidated billing, resource sharing and the like. After verifying the client's authorization to request account linkage and implementing the link, the resource manager 180 may provide updated pool account information (e.g., identifiers of all the accounts linked to the pool) to the client 148 that requested the linkage in account linkage response 621. A programmatic interface 650 that may be provided by interface manager 182 may be used for the account linkage interaction. Various other types of pool-related requests and interactions, not shown in FIGS. 4, 5 and 6, may also be supported by resource manager 180 in some embodiments, such as status requests, description requests, pool metadata modification requests, and the like.

Methods for Implementing Reserved Instance Pool Operations

Figure 7:
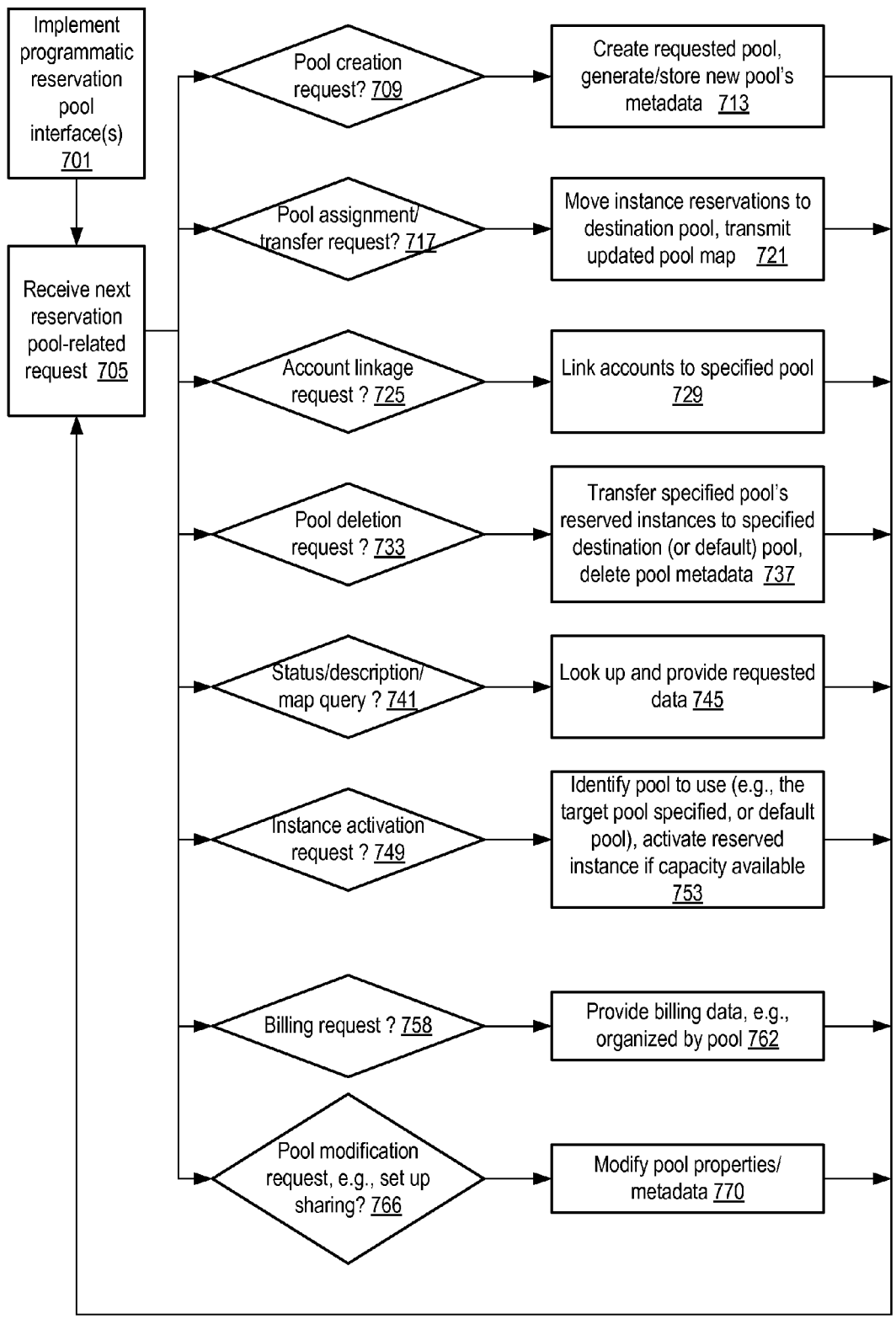
FIG. 7 is a flow diagram illustrating aspects of the functionality of a resource manager dealing with reserved instance pools, according to at least some embodiments.

FIG. 7 is a flow diagram illustrating aspects of the functionality of a resource manager 180 dealing with reserved instance pools, according to at least some embodiments. As shown in element 701, one or more programmatic interfaces (e.g., web pages, APIs, command-line interfaces, or graphical user interfaces) may be implemented for receiving and responding to RI pool requests. In some embodiments, at least some of the interfaces may be implemented by an interface manager 182 separate from the resource manager 180; in other embodiments the interfaces may be implemented by a subcomponent of the resource manager 180. The resource manager 180 may receive the next RI pool-related request (element 705), and depending on the nature of the request, take the appropriate sets of actions.

Several different types of requests may be supported in various embodiments. In each case, the resource manager 180 may in some embodiments first verify that the requesting client has the needed permissions or authorization, before performing the requested tasks. If the client requests that an RI pool be created, as detected in element 709, the resource manager 180 may, as shown in element 713, create the desired pool, generate metadata (and reservation slot records 352) for the pool and optionally store the metadata and reservation slot information in a persistent repository such as resource management database 190. Some of the metadata elements or fields may be populated based on contents of the pool creation request; others may be populated with default values if the creation request does not contain sufficient information, and still others may be left unpopulated. If a pool assignment or transfer request is received (element 717), the resource manager 180 may move the specified reserved instance (or a reserved instance of the specified type) to the specified destination RI pool (element 721) and in some embodiments transmit a client reserved instance map 429 back to the requesting client 148.

If the request is an account linkage request (element 725), the resource manager may update the pool's metadata to reflect the desired linkage (element 729), and in some embodiments may update one or more other databases such as a billing database as well. If the client wishes to delete a pool (element 733), the resource manager may in some embodiments transfer any existing reserved instances of the pool to a different RI pool before deleting the pool metadata (element 737). In one embodiment, if the pool deletion request does not specify a destination pool for existing reserved instances, the instances may be transferred to the default pool of the requester; if a destination pool is specified, the existing reserved instances may be transferred to the specified destination. In some implementations pool deletion may be deferred until the requesting client transfers all existing reserved instances of the pool to another pool.

A client 148 may submit various types of RI pool-related queries in some embodiments. For example, the client may wish to obtain its current reserved instance map (indicating how the client's reserved instances are distributed across various RI pools), view the status of reserved instances in a specified pool, or view the description and/or other metadata for a specified pool. When the resource manager 180 receives such a query (element 741 of FIG. 7), the desired information may be looked up and provided to the requesting client (element 745).

When an instance activation or launch request (element 749) is received in one embodiment, the resource manager 180 may determine which RI pool to use. In some cases the activation request may specify the desired RI pool from which a reserved instance is to be activated, while in other cases the requesting client 148 may not specify an RI pool. If no pool is specified, the default pool of the requester may be selected in some implementations. If a pool is specified, the resource manager 180 may attempt to find a reservation within that pool that matches the other criteria specified in the activation request (e.g., the instance size), and if such a reservation is found, an instance may be launched as requested (element 753). If the specified pool does not contain an appropriate reservation, the actions taken by the resource manager 180 may depend on the activation policy in effect for the specified pool in some embodiments; examples of such actions are described below in conjunction with the description of FIG. 8.

If a billing-related request is received (element 758), such as a request for a consolidated billing report for a specified account or a set of linked accounts, the resource manager 180 may in some embodiments look up the data (e.g., in resource management database 190) and provide it to the requesting client 148. The billing data may be organized by RI pool, so that in scenarios where each pool is associated with a respective set of applications, the costs associated with each application set may be easily determined. Clients 148 may also submit requests to modify RI any desired combination of pool properties—e.g., to set up sharing to allow other clients to access the pool, to change the pool name, to change constraints such as minimum/maximum size, to change various policies such as the pool's activation policies, and so on. When such a pool modification request is received (element 766), the desired changes may be implemented by the resource manager (element 770), e.g., by modifying the pool metadata. It is noted that at least in some embodiments, each of the types of requests illustrated in elements 709, 717, 725, 733, 741, 749, 758, and 766 may be transmitted to the interface manager or the resource manager using a respective different API call or web request. Other types of RI pool-related requests, such as requests to merge pools or change pool ownership may also be supported in some embodiments. Client requests to create new reservations (as opposed to new RI pools) may also specify the pool name or identifier of a pool into which the reservation is to be placed in some embodiments. In response to such a request, the resource manager 180 may create a new reservation with the properties (e.g., reservation term, instance size and so on) indicated in the request, and include the reservation in the specified pool of the requesting client 148.

Figure 8:
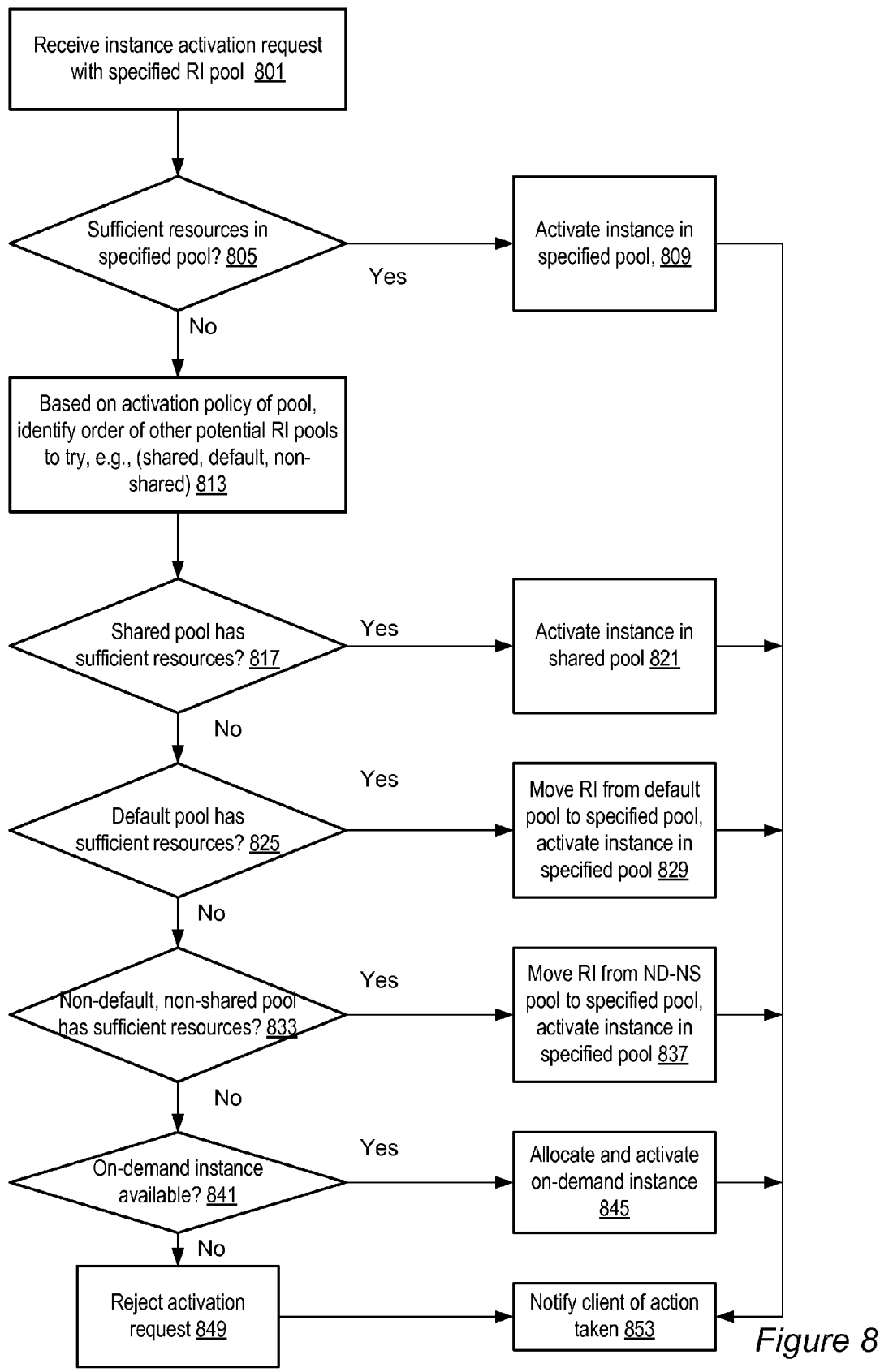
FIG. 8 is a flow diagram illustrating aspects of the functionality of a resource manager related to resource activation requests from clients, according to at least some embodiments.

FIG. 8 is a flow diagram illustrating aspects of the functionality of a resource manager related to resource activation requests from clients, according to at least some embodiments. As indicated in element 801, the resource manager 180 may receive an instance activation request specifying an RI pool from which to select a reservation with a specified set of characteristics (e.g., instance size) for activation. If the specified pool has sufficient resources (e.g., if a reserved instance of the desired size or performance capacity is available in the pool), as detected in element 805, an instance of the specified pool may be activated, as shown in element 809. If, however, no such reserved instance is found in the specified pool (as also detected in element 805), the resource manager 180 may consult the resource activation policy 327 of the pool to determine what actions to take (element 813).

Several different types of resource activation policies 327 may be supported in different embodiments. For example, according to one activation policy, the resource manager 180 may be required to attempt to find an on-demand instance if no appropriate reservation is found in the specified RI pool; and if no on-demand instance is available, the resource manager 180 may be required to reject the request. In some embodiments, instead of immediately resorting to on-demand instances, the activation policy 237 may direct the resource manager 180 to consider alternative RI pools of the requesting client (or of linked accounts) before trying to obtain an on-demand instance (element 813). In the embodiment illustrated in FIG. 8, the resource activation policy 327 in use requires the resource manager 180 to attempt to find a matching reserved instance in other RI pools in the following order: (a) any RI pools that are shared with the requesting client (b) the requesting client's default pool (c) non-shared, non-default RI pools of the requesting client. If a shared pool is found with an appropriate reservation (as detected in element 817), an instance in the shared pool may be activated (element 821). If a reservation is not found in a shared pool (e.g., either because there are no currently shared pools, or because none of the existing shared pools have the desired type of reserved instance), as also detected on element 817, the resource manager may check the default pool (element 825). If the default pool has an appropriate reserved instance, the resource manager in the depicted embodiment may move the instance to the specified pool and activate the instance in the specified pool (element 829). If an adequate reservation is not found in the default pool (as also detected in element 825), one or more non-default, non-shared pools may be examined (element 833), and if an appropriate reservation is found in one of those pools, it may be transferred to the specified pool and the corresponding instance may be launched (element 837).

In the illustrated example, if all these types of pools fail to provide a reserved instance of the desired type, and an on-demand instance with the desired features is available (as detected in element 841), the on-demand instance may be allocated and activated for the client (element 845). The activation request may be rejected if an on-demand instance is not available (element 849). In each case, in some embodiments the client may be notified of the action taken by the resource manager (element 853). Other supported activation policies may include other types of contingent actions that the resource manager 180 may take if the specified RI pool does not have a reservation with the desired characteristics—e.g., the resource manager may be required to use the spot market to obtain an instance of the desired type, or to purchase a new reservation and assign it to the specified pool, and so on.

Example Web-Based Interface for Reserved Instance Pool Requests

FIG. 9 illustrates a portion of an example web-based interface that may be implemented (e.g., by interface manager 182 or by a subcomponent of the resource manager 180) to allow clients 148 to submit reserved instance pool creation requests, according to some embodiments. As shown, the interface may include a web page 900 that includes a message area 903 and a number of fields that may be filled by a client to provide specifications or preferences for a desired reserved instance pool. Field 907 may be used by the client 148 to provide a name for the RI pool, and a description of the pool may be entered via field 909. A master billing account for the RI pool may be specified via element 911; as shown, by default the account of the requesting client may be selected as the master billing account. In the illustrated example, the client has the option of specifying other accounts to be linked to the RI pool, by specifying one or more account names or account numbers in field 913.

Using field 915, the client may specify one or more shared RI pools which may be used for example for requests from a plurality of clients, including the requesting client. An initial number of reserved instances to include in the newly-created pool may be specified via field 917, and the instance size(s) for that initial set of reserved instances may be specified via field 919. A maximum pool size may be specified via field 921. Field 923 may be used to specify the access control policies 323 to use for the pool. A resource activation policy 327 for the pool may be indicated by the client using field 925. In some embodiments the client may be able to specify default configuration settings for the instances to be included in the pool, such as a default machine image to be used for virtual compute instances specifiable via element 927. Button 991 may be used to submit the pool creation request.

As shown in FIG. 9, the resource manager may populate several of the fields with default values, and/or provide a menu of drop-down values from which the client may select a desired option. Elements similar to those illustrated in FIG. 9 may be used in other parts of a web interface provided to the client in some embodiments, e.g., to update or modify an existing pool. In some embodiments clients may be provided the option of submitting pool creation requests and/or other RI pool-related requests via various API calls instead of using web-based interfaces.

Example Use Cases

The techniques described above for supporting user-specified capacity reservation pools may be useful in a wide variety of environments. As the number of applications being deployed to cloud-based environments grows, the need to support dynamically-changing needs of cloud customers will also tend to grow. The ability of a resource manager to allow customers greater control on the way that their reserved instances are managed and allocated, and to provide billing information that allows customers to view usage and costs based on a per-pool basis is likely to lead to greater levels of customer satisfaction and retention. Supporting user-specified named pools that can each be dedicated to applications of a particular type may also allow clients to avoid situations in which they have to shut down instances devoted to one type of application, in order to obtain an additional instance for another type of application.

The functionality described above may also be particularly appealing to third-party providers that act as intermediaries between their own clients and the provider network. Such third parties may for example have to manage fluctuating demands for reserved instances from numerous clients. The ability to create pools for each of the clients, to transfer capacity across the polls as needed, and to link various accounts to various pools may allow the third parties to reduce their costs related to long-term reservations, while also catering efficiently to their client's workload variations.

Illustrative Computer System

Figure 10:
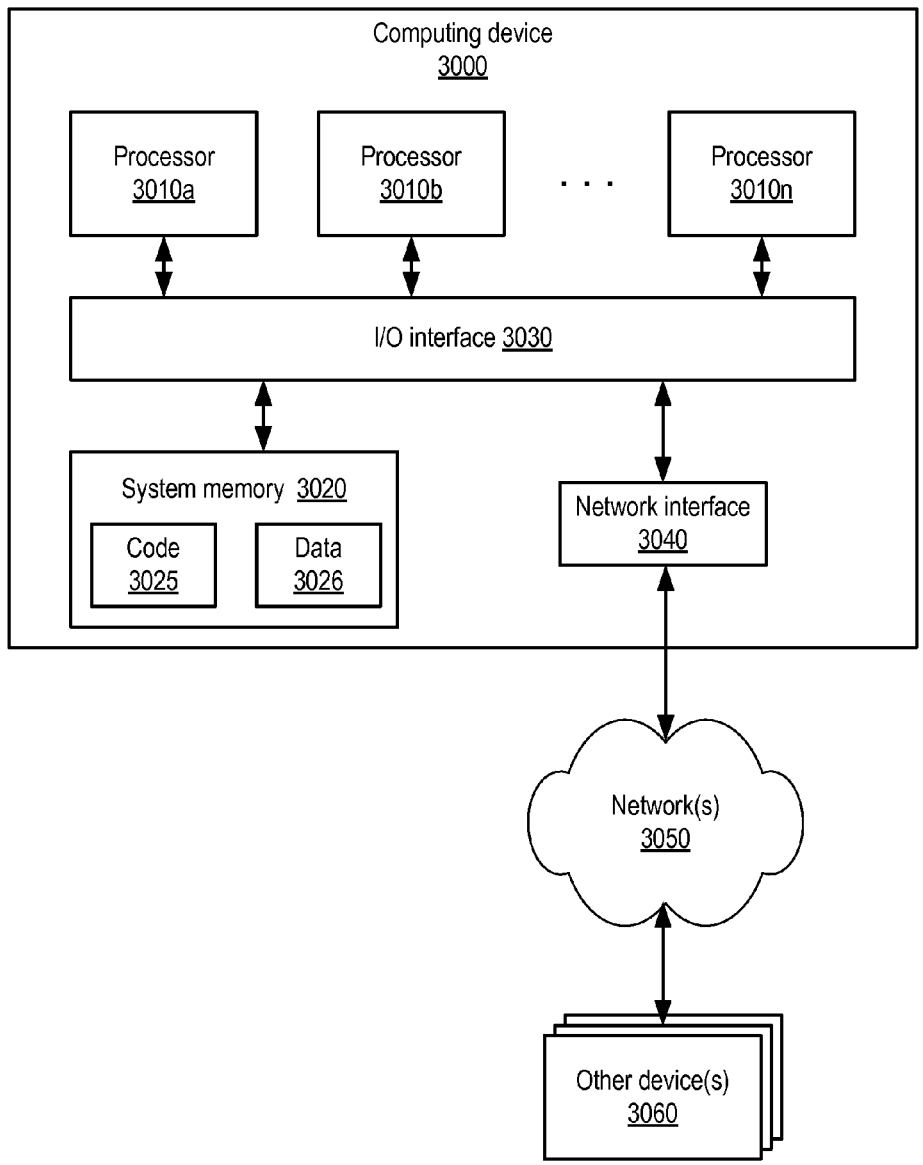
FIG. 10 is a block diagram illustrating an example computing device that may be used in some embodiments.

In at least some embodiments, a server that implements a portion or all of one or more of the technologies described herein, including the techniques to implement the functionality of resource manager 180 and interface manager 182 may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of hardware computing devices configured to implement a plurality of resource instances of a provider network; and
    one or more hardware computing devices configured to implement a resource manager, wherein the resource manager is configured to:
        in response to receiving, from a first client, a pool assignment request specifying a first pool identifier, assign a first one or more resource instance reservations to a first reserved instance pool, wherein the first pool identifier identifies the first reserved instance pool;
        create a link between the first reserved instance pool identified by the first pool identifier and a second reserved instance pool identified by a second pool identifier, wherein a second one or more resource instance reservations are assigned to the second reserved instance pool; and
        in response to receiving, from the first client, an instance activation request specifying the first pool identifier identifying the first reserved instance pool:
            identify a particular reserved instance pool from which to select a particular resource instance reservation for activation, wherein to identify the particular reserved instance pool, the resource manager is configured to:
                determine whether there are sufficient resource instances in the first reserved instance pool to satisfy the instance activation request; and
                select, based at least on a determination that there are insufficient resource instances in the first reserved instance pool to satisfy the instance activation request and on the link between the first reserved instance pool and the second reserved instance pool, the second reserved instance pool as the particular reserved instance pool from which to select the particular resource instance reservation for activation; and
            activate on one of the plurality of hardware computing devices and responsive to the instance activation request that specifies the first pool identifier and based at least in part on said select the second reserved instance pool as the particular reserved instance pool, a particular resource instance of the plurality of resource instances corresponding to the second one or more resource instance reservations of the second reserved instance pool.

2. The system as recited in claim 1, wherein, prior to assigning the first one or more resource instance reservations, the resource manager is further configured to:
    in response to a pool creation request from the first client specifying the first pool identifier, create the first reserved instance pool with the first pool identifier.

3. The system as recited in claim 1, wherein the resource manager is further configured to:
    in response to a reservation transfer request specifying the particular pool as a source pool and another reserved instance pool created on behalf of the first client as a destination pool, transfer the particular resource instance reservation from the particular pool to the other pool.

4. The system as recited in claim 1, wherein the resource manager is further configured to:
    in response to an account linkage request specifying (a) an account identifier and (b) the first pool identifier, link the account identifier to the first pool identifier; and
    transmit, to an owner of the account with the specified account identifier, a report associated with a resource instance reservation assigned to the pool identified by the first pool identifier.

5. The system as recited in claim 1, wherein the resource manager is further configured to:
    in response to (a) a pool sharing request specifying that the first client and a second client are to share access to a particular pool, and (b) a request for a resource instance reservation from the second client, assign a resource instance reservation from the particular pool to the second client.

6. The system as recited in claim 1, wherein the interface manager is further configured to:
    implement one or more programmatic interfaces allowing a client to specify a pool identifier of a reserved instance pool from which a resource instance reservation is to be selected in response to at least one of: an instance activation request, a report request, an instance status request, an instance description request, or a reservation transfer request;
    wherein the instance activation request is received in accordance with an interface of the one or more programmatic interfaces.

7. A method, comprising:
    performing, by one or more hardware computing devices:
        in response to receiving, from a first client, a pool assignment request specifying a first pool identifier, assigning a first one or more resource instance reservations to a reserved instance pool, wherein the first pool identifier identifies the first reserved instance pool;
        creating a link between the first reserved instance pool identified by the first pool identifier and a second reserved instance pool identified by a second pool identifier; and
        in response to receiving, from the first client, an instance activation request specifying the first pool identifier identifying the first reserved instance pool:
            identifying a particular pool from which to select a particular resource instance reservation for activation, wherein said identifying comprises:
                determining whether there are sufficient resource instances in the first reserved instance pool to satisfy the instance activation request; and selecting, based at least on determining that there are insufficient resource instances in the first reserved instance pool to satisfy the instance activation request and on the link between the first reserved instance pool and the second reserved instance pool, the second reserved instance pool as the particular reserved instance pool from which to select the particular resource instance reservation for activation; and activating, responsive to the instance activation request specifying the first pool identifier and based at least in part on said selecting the second reserved instance pool as the particular reserved instance pool, a particular resource instance of the plurality of resource instances corresponding to a second one or more resource instance reservations of the second reserved instance pool.

8. The method as recited in claim 7, further comprising:
including, within a report provided to the first client for use of the particular resource instance, an indication of a pool identifier of the particular pool.

9. The method as recited in claim 7, further comprising:
prior to assigning the first one or more resource instance reservations, creating the first reserved instance pool with the first pool identifier in response to a pool creation request from the first client.

10. The method as recited in claim 7, further comprising:
in response to a reservation transfer request specifying the particular pool as a source pool and an other reserved instance pool created on behalf of the first client as a destination pool, transferring the particular resource instance reservation from the particular pool to the other pool.

11. The method as recited in claim 7, further comprising:
in response to an account linkage request specifying (a) an account identifier and (b) the first pool identifier, linking the account identifier to the first pool identifier; and
transmitting, to an owner of the account with the specified account identifier, a report associated with a resource instance reservation assigned to the pool identified by the first pool identifier.

12. The method as recited in claim 7, further comprising:
in response to (a) a pool sharing request specifying that the first client and a second client are to share access to the particular pool, and (b) a request for a resource instance reservation from the second client, assigning a resource instance reservation from the particular pool to the second client.

13. The method as recited in claim 7, further comprising:
implementing one or more programmatic interfaces allowing a client to specify a pool identifier of a reserved instance pool from which a resource instance reservation is to be selected in response to at least one of: an instance activation request, a report request, an instance status request, an instance description request, or a reservation transfer request;
wherein the instance activation request is received in accordance with an interface of the one or more programmatic interfaces.

14. The method as recited in claim 7, further comprising:
associating a default reserved instance pool with the first client; and
in response to an other resource activation request from the first client, wherein the other resource activation request does not specify a reserved instance pool identifier, selecting an other resource instance reservation from the default pool for activation, and activating the other resource instance.

15. The method as recited in claim 7, further comprising:
in response to an instance reservation request from the first client, wherein the reservation request specifies the first pool identifier, adding a new resource instance reservation to the first reserved instance pool with the first pool identifier.

16. A non-transitory computer-accessible storage medium storing program instructions that when executed on one or more processors:
in response to receiving, from a first client, a pool assignment request specifying a first pool identifier, assign a first one or more resource instance reservations to a first reserved instance pool, wherein the first pool identifier identifies the first reserved instance pool;
create a link between the first reserved instance pool identified by the first pool identifier and a second reserved instance pool identified by a second pool identifier; and
in response to receiving, from the first client, an instance activation request specifying the first pool identifier identifying the first reserved instance pool:
identify a particular pool created on behalf of the first client from which to select a particular resource instance reservation for activation, wherein to identify the particular pool, the program instruction are executable to:
determine whether there are sufficient resource instances in the first reserved instance pool to satisfy the instance activation request, and
select, based at least on a determination that there are insufficient resource instances in the first reserved instance pool to satisfy the instance activation request and on the link between the first reserved instance pool and the second reserved instance pool, the second reserved instance pool as the particular reserved instance pool from which to select the particular resource instance reservation for activation; and
activate, responsive to the instance activation request that specifies the first pool identifier and based at least in part on said select the second reserved instance pool. a particular resource instance of the plurality of resource instances corresponding to a second one or more resource instance reservations of the second reserved instance pool.

17. The storage medium as recited in claim 16, wherein the instructions when executed on the one or more processors:
include, within a report provided to the first client for use of the particular resource instance, an indication of a pool identifier of the particular pool.

18. The storage medium as recited in claim 16, wherein the instructions when executed on the one or more processors:
prior to assigning the first one or more resource instance reservations, create the first reserved instance pool with the first pool identifier in response to a pool creation request from the first client.

19. The storage medium as recited in claim 16, wherein the instructions when executed on the one or more processors:
in response to a reservation transfer request specifying the particular pool as a source pool and an other reserved instance pool created on behalf of the first client as a destination pool, transfer the particular resource instance reservation from the particular pool to the other pool.

20. The storage medium as recited in claim 16, wherein the instructions when executed on the one or more processors:
   in response to an account linkage request specifying (a) an account identifier and (b) the first pool identifier, link the account identifier to the first pool identifier; and
   transmit, to an owner of the account with the specified account identifier, a report associated with a resource instance reservation assigned to the pool identified by the first pool identifier.

21. The storage medium as recited in claim 16, wherein the instructions when executed on the one or more processors:
   in response to (a) a pool sharing request specifying that the first client and a second client are to share access to the particular pool, and (b) a request for a resource instance reservation from the second client, assign a resource instance reservation from the particular pool to the second client.

22. The storage medium as recited in claim 16, wherein the instructions when executed on the one or more processors:
   implement one or more programmatic interfaces allowing a client to specify a pool identifier of a reserved instance pool from which a resource instance reservation is to be selected in response to at least one of: an instance activation request, a report request, an instance status request, an instance description request, or a reservation transfer request;
   wherein the instance activation request is received in accordance with an interface of the one or more programmatic interfaces.

23. The storage medium as recited in claim 16, wherein the instructions when executed on the one or more processors:
   associate a default reserved instance pool with the first client; and
   in response to an other resource activation request from the first client, wherein the other resource activation request does not specify a reserved instance pool identifier, select an other resource instance reservation from the default pool for activation, and activating the other resource instance.

24. The storage medium as recited in claim 16, wherein the instructions when executed on the one or more processors:
   in response to an instance reservation request from the first client, wherein the reservation request specifies a first pool identifier, adding a new resource instance reservation to the first reserved instance pool with the first pool identifier.

25. The storage medium as recited in claim 16, wherein the instructions when executed on the one or more processors:
   store an indication of a resource activation policy in effect for the particular pool, wherein the resource activation policy comprises indications of one or more steps to be taken in response to a determination that the particular pool does not include a reservation matching one or more criteria specified in a particular instance activation request.

* * * * *